UNITED STATES PATENT OFFICE.

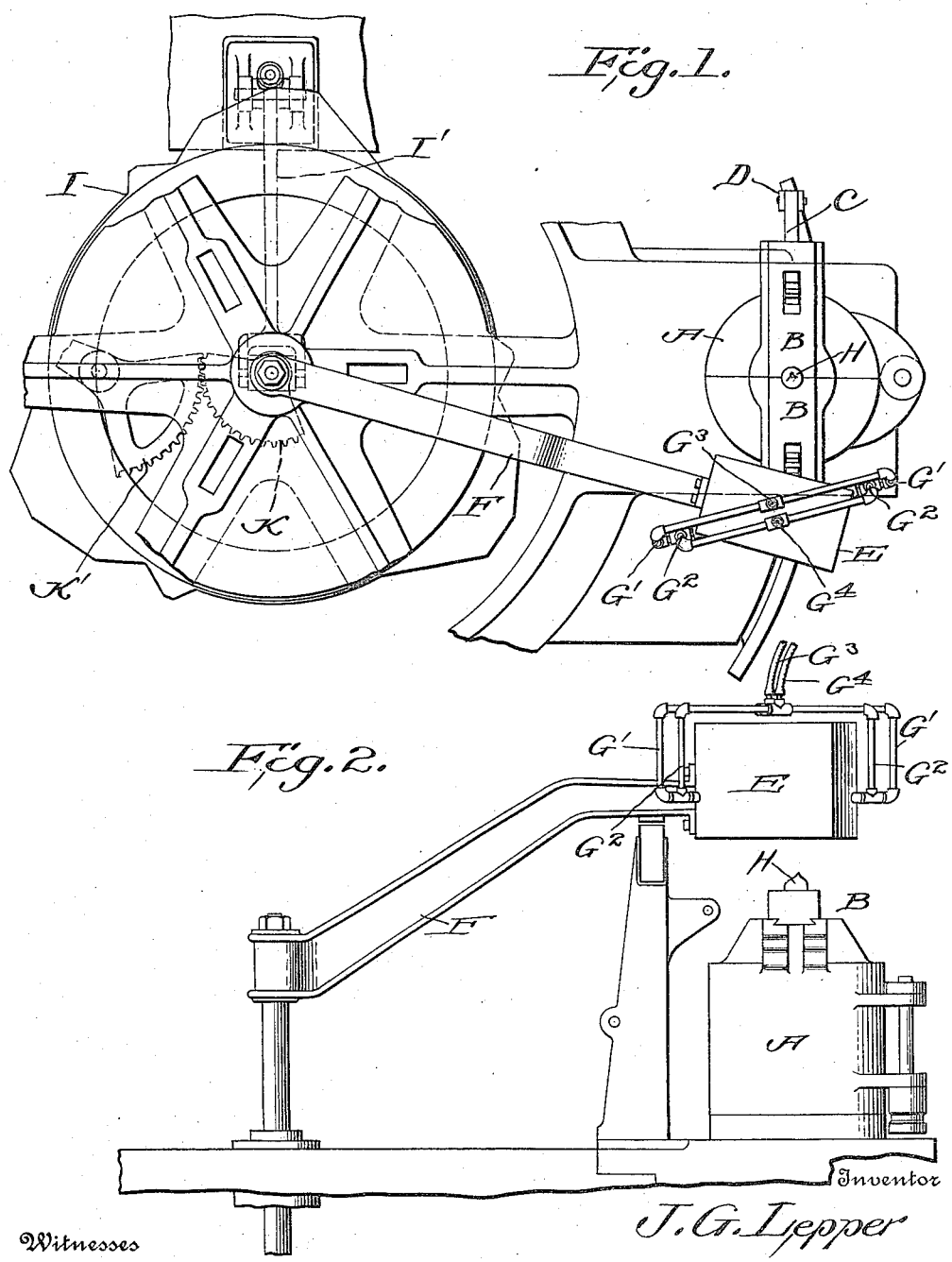

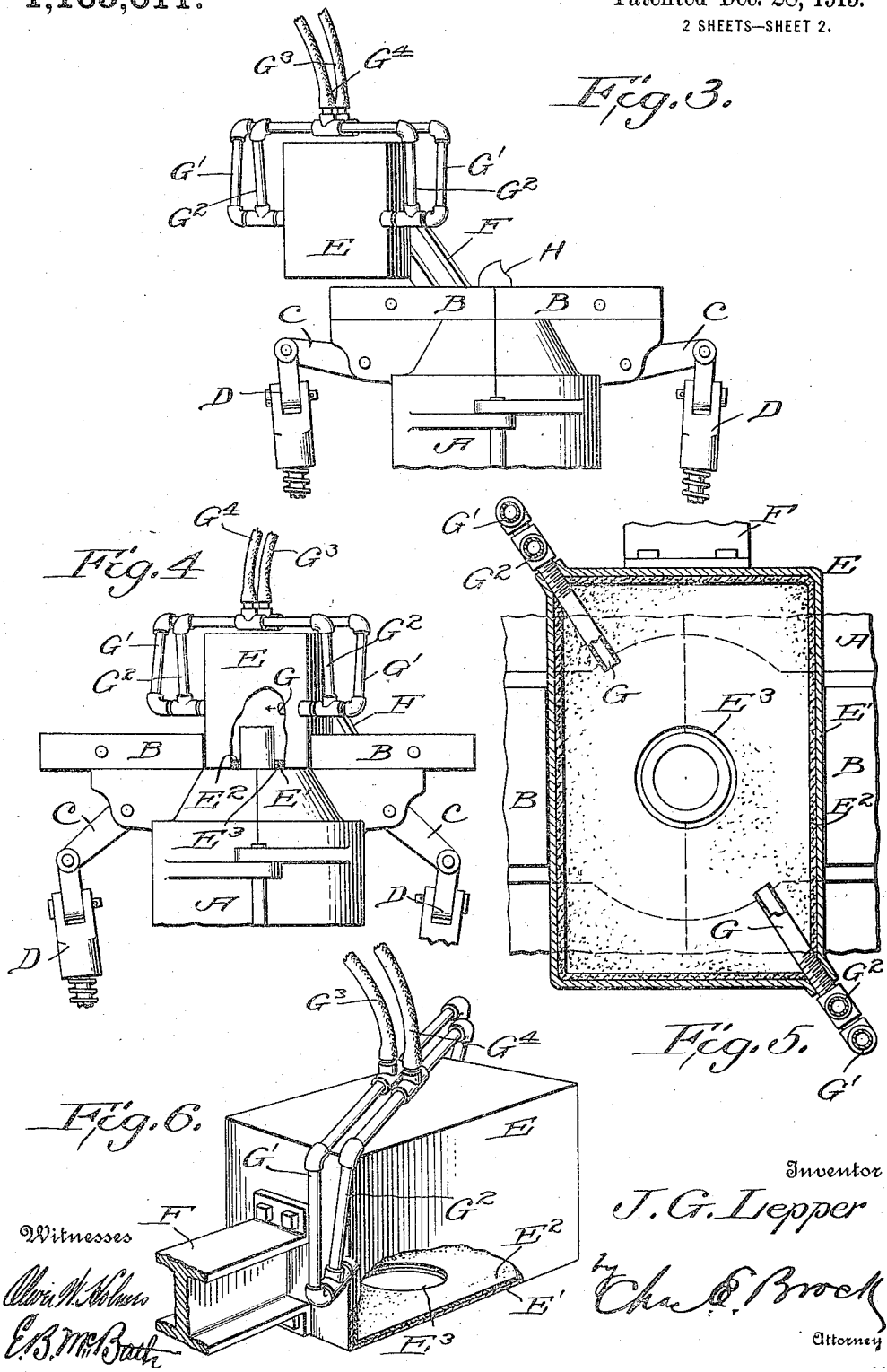

JOHN G. LEPPER, OF WATERBURY, CONNECTICUT, ASSIGNOR, BY MESNE ASSIGNMENTS, TO THE LEPPER MACHINE COMPANY, OF BRIDGEPORT, CONNECTICUT, A CORPORATION OF CONNECTICUT.

REHEATING DEVICE FOR BOTTLE-MAKING MACHINES.

1,165,611. Specification of Letters Patent. Patented Dec. 28, 1915.

Application filed January 3, 1912. Serial No. 669,187.

*To all whom it may concern:*

Be it known that I, JOHN G. LEPPER, a citizen of the United States, residing at Waterbury, in the county of New Haven and State of Connecticut, have invented a new and useful Reheating Device for Bottle-Making Machines, of which the following is a specification.

This invention is a device or means for reheating the neck of a bottle after the blowing operation has been completed and previous to the finishing of the neck. This device or means is particularly adapted for use in connection with the bottle making machine for which application for Letters Patent was filed October 13, 1911, Serial Number 654,481, but it will be understood that this heating device can be used in connection with other forms of molds and machines.

The object of my invention is to provide a simple and efficient means for sufficiently reheating the neck of the bottle ready for the operation of the finishing tool, and another object of the invention is to provide a heating device in connection with a movable mold so that the heating operation can be accomplished simultaneously with the movement of the molds; and a still further object of the invention is to provide a heating device which owing to its location can also be utilized to break off or clear away the blow over formed upon the top of the mold.

With these various objects in view my invention consists essentially in providing a receptacle or chamber into which one or more torches or burners are introduced for the purpose of heating the neck of the bottle, said receptacle or chamber having an opening in the bottom thereof through which the said neck of the bottle enters the receptacle or chamber.

The invention consists also in arranging the heating chamber or receptacle upon the end of an arm capable of movement in unison with a movable mold whereby the neck of the bottle can be heated simultaneously with the movement of the mold; and the invention consists also in providing for a return movement of said arm whereby the heating device is rendered capable of operation in connection with a series of movable molds.

The invention consists also in certain details of construction and novelties of combination which will be described hereinafter and pointed out in the claims.

In the drawings forming a part of this specification: Figure 1 is a plan view of a heating device constructed in accordance with my invention and arranged for coöperation with a movable mold, a sufficient amount of actuating mechanism being shown for the purpose of illustrating the operation of the device. Fig. 2 is a side view of the same. Fig. 3 is an end view of the heating device and mold, the mold being shown as closed, the bottle having been blown and the mold just ready to be started on its movement. Fig. 4 is a similar view showing the neck forming portions of the mold separated and the heating device dropped or lowered between said neck forming sections, enveloping the neck of the bottle for the purpose of reheating the same, this being the positions which the mold and heating device assume and maintain during the first period of movement of the mold. Fig. 5 is a horizontal sectional view of the heating receptacle or chamber, and Fig. 6 is a detail perspective view showing the arrangement of the air and gas pipes.

In the drawings forming a part of this specification A, represents a mold consisting of two vertical sections hinged together, and each vertical section is provided with a horizontally slidable neck forming section B, which is operated through the medium of elbow lever C, and rod D, these elements constituting the subject matter of another application Serial Number 688,921 filed of even date herewith. This mold A, is movable preferably in the path of a circle. Means for moving said mold and actuating the same form the subject matter of the application filed October 13, 1911 and previously referred to. As the mold starts upon its initial movement it is caused to pass beneath the heating device so that the neck of the bottle may be reheated preparatory to being finished. This heating device consists of a receptacle or chamber E, arranged upon the outer end of the movable arm F. This receptacle or chamber E, is composed of noncombustible material and in practice I have constructed the same with an exterior metallic portion E′, and the interior lining E², of asbestos or any other suitable material. This receptacle or chamber E is of such a width that when lowered as shown in Fig. 4 it will rest snugly between the separated neck forming portions B, and an opening E³, in the bottom of the receptacle or chamber permits the neck of the bottle to project upwardly into the said chamber as most clearly shown in Fig. 4. Torches or burners G, are projected into the receptacle or chamber E, preferably at the opposite corners as shown, said torches or burners having gas and air pipes G' and G², respectively, connected therewith, these pipes receiving their supply from flexible connections G³ and G⁴, respectively. Any suitable form of burner may be employed and any suitable manner of connecting the air and gas pipes can be utilized without departing from the broad principle of my invention which contemplates the enveloping of the neck of the bottle during the movement of the mold in order to reheat said neck preparatory to finishing.

As above stated the receptacle or chamber E, is arranged upon the outer end of the arm F, and this arm F, normally occupies a position slightly in advance of the mold and maintains the receptacle or chamber elevated a slight distance above the top of said mold. After the bottle is blown the mold is started and first of all the blow-over indicated at H, in Fig. 3 comes in contact with the lower edge of the receptacle or chamber which serves to break said blow-over and clear the same away. When the mold has moved a sufficient distance to bring the same directly beneath the heating device the neck forming sections are separated and as soon as these sections separate the arm carrying the heating device drops through the medium of the cam I, and lever I', shown in Fig. 1 and this arm is then caused to move in unison with the mold through the medium of the toothed segments K and K', also shown in Fig. 1.

The cam I is of such shape that it actuates the lever I' so that the arm F is raised as it moves back to its initial position and drops down upon the opened mold as the mold starts to move away, the movement of the arm F back and forth being accomplished by the toothed segments K and K', the actuating segment being moved by the power of the bottle making machine.

As before stated the heating device is lowered simultaneously with the opening of the neck forming sections, or nearly so thereby immediately enveloping the neck of the bottle and subjecting the same to the heating operation during the entire movement of the mold and at the completion of this movement the heating device is lifted through the medium of the lever and cam previously referred to and is returned to its normal position through the medium of the toothed segments leaving the reheated neck of the bottle in condition for the operation of the finishing tool and the heating device having returned to its initial position is ready for operation upon the next bottle neck, the device in reality constituting a movable or traveling glory-hole. It will thus be seen that I provide an exceedingly simple and highly efficient means or device for reheating the neck of the bottle and maintaining the same during the movement of said bottle toward the finishing tool, and it will also be noted that the combined operations of the mold and heating device serve to break off and clear away the blow-over formed during the blowing operation. It will also be understood that the details of construction and arrangement may be changed or varied considerably without departing from the broad principle of my invention.

What I claim is:

1. In a reheating device for bottle making machines, a mold having separable neck forming sections, means for moving said mold toward a finishing tool, a cam operated arm normally in advance of said mold and slightly elevated, a heating device carried by said arm and beneath which said mold is adapted to travel, and means for causing said neck forming sections to open at a predetermined point of travel of the mold, the said arm being lowered and causing said heating device to enter between said neck forming portions as they open, thereby enveloping the bottle neck during a portion of the travel of the mold, said arm and reheating device returning to normal position as the mold approaches the finishing tool.

2. In a bottle making machine the combination with a mold having separable neck-forming sections, said mold being adapted to travel in the arc of a circle, of a heating device having an opening in the bottom thereof, and an arm carrying said heating device, means for moving said arm back and forth in the arc of a circle, and means for raising and lowering said arm, said device being adapted to be lowered upon the mold and move in unison therewith and then raised and returned to its initial position.

3. In a bottle making machine the combination with a bottle making mold having openable upper portions, said mold being adapted to travel in the arc of the circle, of a heating device adapted to envelop and heat the exposed portion of a bottle held within said mold, said heating device being movable in unison with said bottle and mold for a predetermined distance, means for so moving said heating device and means for returning said receptacle to its initial position.

4. In a bottle making machine the combination with a mold having openable upper sections, said mold being adapted to travel in the arc of a circle, of a heating receptacle adapted to envelop and re-heat the exposed portion of a bottle held within said mold, said receptacle being adapted to move with said mold for a portion of its travel, a cam and lever and operative connection for raising and lowering said heating receptacle and segmental gears operating upon the receptacle carrying means for moving said receptacle back and forth in the arc of a circle for the purpose specified.

JOHN G. LEPPER.

Witnesses:
 CHAS. E. BROCK,
 SAMUEL P. WILLIAMS, Jr.

Copies of this patent may be obtained for five cents each, by addressing the "Commissioner of Patents, Washington, D. C."